United States Patent Office 3,121,615
Patented Feb. 18, 1964

3,121,615
COLORIMETRIC MOISTURE INDICATOR
Stanley D. Price, Wilkinsburg, Pa., assignor to Mine Safety Appliances Company, Pittsburgh, Pa., a corporation of Pennsylvania
No Drawing. Original application Sept. 2, 1960, Ser. No. 53,601. Divided and this application May 4, 1962, Ser. No. 192,316
4 Claims. (Cl. 23—254)

This invention relates to means for indicating colorimetrically the presence of a predetermined amount of moisture in a gaseous atmosphere, and more particularly in a gas mask canister.

This application is a division of my copending application Serial Number 53,601, filed September 2, 1960, and now abandoned.

For various purposes it is necessary to know when the moisture content of a gaseous atmosphere, for example air, reaches a certain maximum, or critical, value, as in some manufacturing operations where moisture in excess of a certain value is objectionable. Especially is this true in the case of breathing apparatus containing chemicals or reagents the utility of which is adversely affected by water in excess of definite maximum amounts. For example, gas masks and related breathing apparatus for use in atmospheres containing carbon monoxide commonly contain an oxidizing catalyst such as the well known hopcalite. That catalyst functions best in a dry atmosphere but its efficiency is impaired by moisture. Consequently an efficient drying substance is disposed in the canister ahead of the catalyst in the path of the air. In the use of such a canister the dryer becomes ineffective through absorption of moisture and due to absorption of water by the catalyst its efficiency decreases to a point where the canister must be discarded. In the case of hopcalite this usually occurs when it has picked up from approximately 1.8 to 3.5 percent of moisture. In the case of other catalysts the amount of water that can be tolerated before the catalyst becomes ineffective will depend on the particular catalyst.

A canister for handling carbon monoxide must meet a U.S. Bureau of Mines test in which 0.2 percent of carbon monoxide in air at 50 percent relative humidity and at a flow rate of 64 liters per minute is fed to a canister until a leakage of 0.03 percent of carbon monoxide occurs. This is the maximum leakage permissible, beyond which the canister should no longer be used.

Carbon monoxide is, of course, odorless and colorless. It is therefore necessary to provide means to warn a user when a canister should no longer be used. A common way of doing that is to provide the canister with means that indicate by color change when the usefulness of the canister has passed. A type of canister of this class is shown in the Yablick Patent No. 1,725,893. A window is disposed longitudinally of the canister and colorimetric means for indicating a change in the canister is visible through the window.

Various reagents that are susceptible to color change in the presence of moisture are known, and some have been used in connection with gas mask canisters such, for example, as filter paper impregnated with 2 percent of cobalt bromide. Such an indicator changes from a bluish purple-blue to a lighter shade (Munsell 2.5 PB 7/6 to 2.5 PB 8/2) when hopcalite has picked up the amount of moisture beyond which it is not safe to use the canister. Obviously, the more pronounced the color differences between a safe condition and an unsafe one the greater is the value of the indicator. Such indicators are commonly used with a color standard the color of which represents the condition of the catalyst when the canister is no longer safe to use. The maximum contrast between the reagent paper and the color standard is had when the canister is fresh or unused, when it functions at a maximum efficiency. In use the reagent color changes until it matches the reference, and the canister should then be discarded. Although cobalt bromide has been used for this purpose, the color contrast, between a fresh and an unsafe canister leaves something to be desired.

It is among the objects of this invention to provide efficient means for indicating colorimetrically the presence of moisture in a gaseous atmosphere, and more particularly the presence of moisture in a catalyst at a predetermined value.

A further object is to provide a colorimetric indication when a breathing apparatus containing an oxidizing catalyst, such as hopcalite, becomes so contaminated with moisture as to be no longer safe to protect the user against carbon monoxide.

Yet another object is to provide a method of making a colorimetric indicator for use in breathing apparatus that is simple, easily practiced with readily available materials, and provides sharper color contrast between safe and dangerous conditions than the colorimetric indicators used heretofore.

Other objects will appear from the following specification.

I have discovered, and it is upon this that the invention is predicated, that its objects are attained by impregnating a carrier with cobalt iodide that is essentially free from free iodine and in this form is stabilized against change during handling, during storage, and while assembling in a device with which it is to be used.

In accordance with the invention an aqueous solution of cobalt iodide is treated with sodium thiosulfate to convert the free iodine that is normally in such a solution to colorless sodium iodide. This is accomplished by a minimum amount of sodium thiosulfate that causes the solution to change from its normal amber color to pink. If a carrier is impregnated with this solution and then exposed to air and moisture there will be liberation of iodine and this will alter the color. I have found, however, that by the addition of a sufficient excess of sodium thiosulfate over that necessary to convert the free iodine to sodium iodide and bring the solution to a pink color, the impregnated carrier is stabilized against liberation of iodine for a sufficient length of time to permit the preparation of the indicator means during a reasonable length of time. There is nothing critical as to the excess thiosulfate provided enough is present to prevent iodine liberation during normal handling in the atmosphere.

Various inert materials are available as carriers such, for instance, as silica gel or pumice. However, filter paper is preferred because it absorbs the cobalt iodide solution readily and evenly with more distinct and vivid color changes than are to be had with other carriers. Also, filter paper is easily adapted mechanically to the canister window in contact with the hopcalite.

Filter paper impregnated with the solution is in a dry atmosphere of a bluish green color (Munsell 7.5 G 8/4) which changes to a very pale bluish green approaching a neutral (Munsell neutral 8.5) when the hopcalite has absorbed approximately 3.5 percent of moisture.

For most purposes it is preferred that the solution used for impregnating the carrier contain about 2.5 percent of cobalt iodide. The exact concentration is not critical and may range, for example, from 0.5 percent to 4 percent. The preferred concentration, however gives the best contrast in color change.

As an example, 25 grams of commercial anhydrous cobalt iodide are dissolved in one liter of water and the solution is then filtered. The filtrate will be distinctly amber colored. Sufficient sodium thiosulfate is then added to cause the solution to become pink colored. Generally about 1.5 grams of the sodium thiosulfate pentahydrate ($Na_2S_2O_3.5H_2O$) suffice thus to convert the free iodine to sodium iodide. Sufficient excess thiosulfate is then added as a stabilizer against iodine liberation during handling in the atmosphere; about 1.25 grams is generally sufficient.

The carrier is then impregnated with the pink solution. For example, a 950 sq. cm. sheet of Whatman 3 MM filter paper is placed on a flat glass plate and 20 cc. of the prepared solution is distributed evenly over the entire surface. The paper is then allowed to air dry, which usually is complete in 3 or 4 hours. It can then be installed in a canister when in the absence of moisture it assumes a bluish green color that will be altered when the canister is put in use.

If the impregnated paper is not to be installed immediately in canisters it is then stored in a sealed container with some silica gel. While stored it assumes its bluish green color but upon exposure to atmospheric moisture it becomes pink again when removed for installation in the canister, and when installed it resumes its bluish green color. The excess sodium thiosulfate thus acts as a stabilizer to prevent the liberation of iodine while the paper is being impregnated and dried, and while being handled in the atmosphere.

For ease and certainty of knowing when the hopcalite or other reagent has attained the amount of moisture beyond which the canister should not be used there is installed side by side with the indicator a reference standard the color of which matches that developed by the indicator at about 3.5 percent moisture. This reference is preferably a strip of filter paper impregnated with permanent pigment of the exact color which the indicator will develop at the predetermined moisture level.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. That method of making an indicator responsive to changes in humidity of an atmosphere to which it is exposed comprising preparing an aqueous solution of cobalt iodide, treating said solution with sodium thiosulfate to develop a pink color, adding a further amount of sodium thiosulfate to stabilize the indicator against liberation of free iodine during preparation and handling of the indicator, impregnating an inert carrier with the pink solution, and drying the impregnated carrier, the indicator in use changing from a bluish green at substantially zero relative humidity to a pale bluish green approaching neutral at about 3.5 percent moisture.

2. That method of making an indicator responsive to changes in humidity of an atmosphere to which it is exposed comprising preparing an aqueous solution of cobalt iodide, treating said solution with sodium thiosulfate to develop a pink color adding a further amount of sodium thiosulfate to stabilize the indicator against liberation of free iodine during preparation and handling of the indicator, impregnating an inert carrier with the pink solution, drying the impregnated carrier, and protecting the dried carrier against atmospheric air and moisture until it is to be used, the indicator in use changing from a bluish green at substantially zero relative humidity to a pale bluish green approaching neutral at about 3 percent relative humidity at room temperature.

3. A method according to claim 2, said carrier being filter paper.

4. A method according to claim 3, the solution containing about 2.5 percent by weight of cobalt iodide.

References Cited in the file of this patent

UNITED STATES PATENTS 2,460,073    Davis _____ Jan. 25, 1949